Oct. 19, 1954     M. G. DENTON     2,691,927
SELF-PROPELLED GROUNDWORKING AND CLEARING MACHINE
Filed Dec. 24, 1948                      6 Sheets-Sheet 1
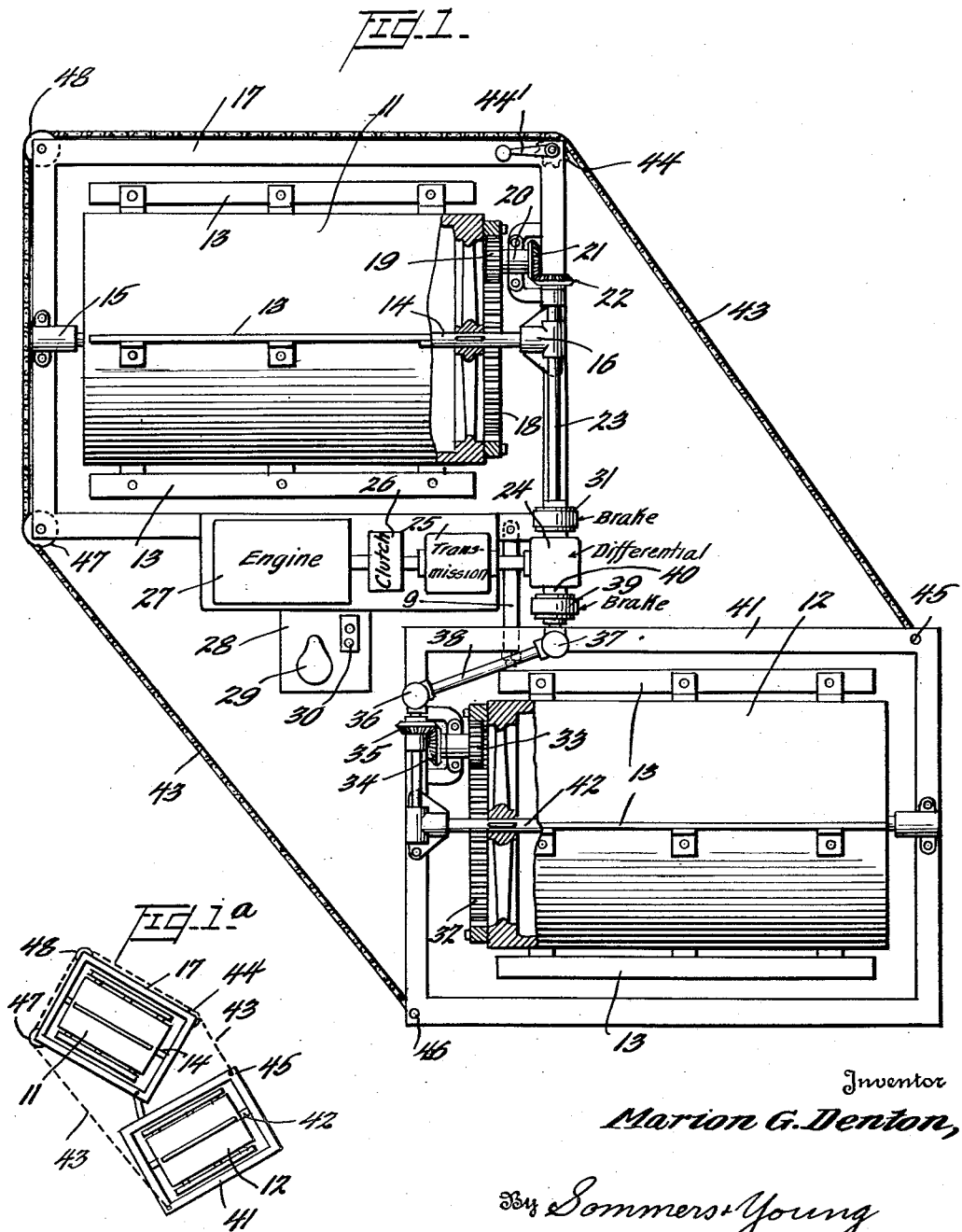
Inventor
Marion G. Denton,
By Sommers & Young
ATTORNEYS

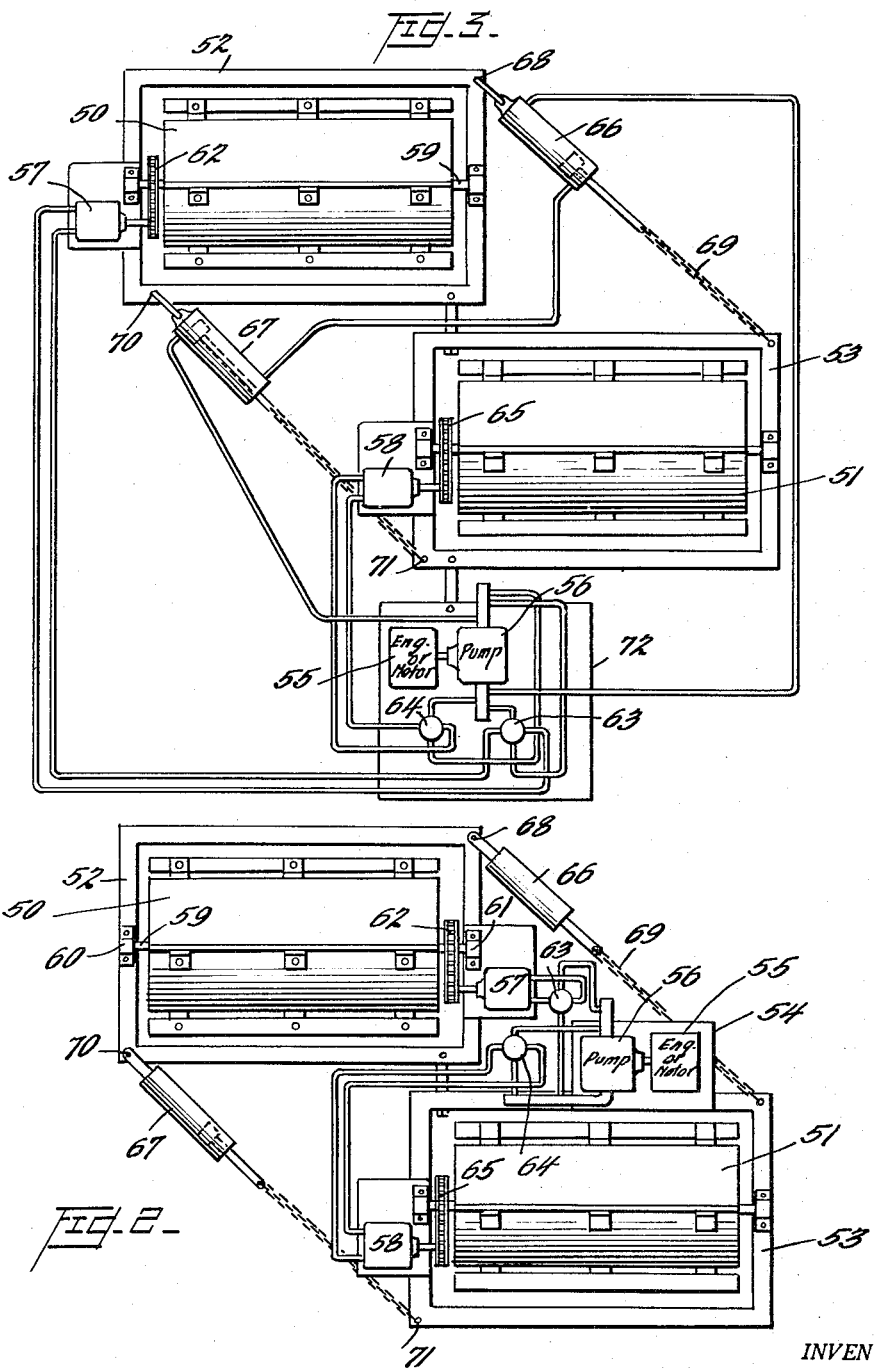

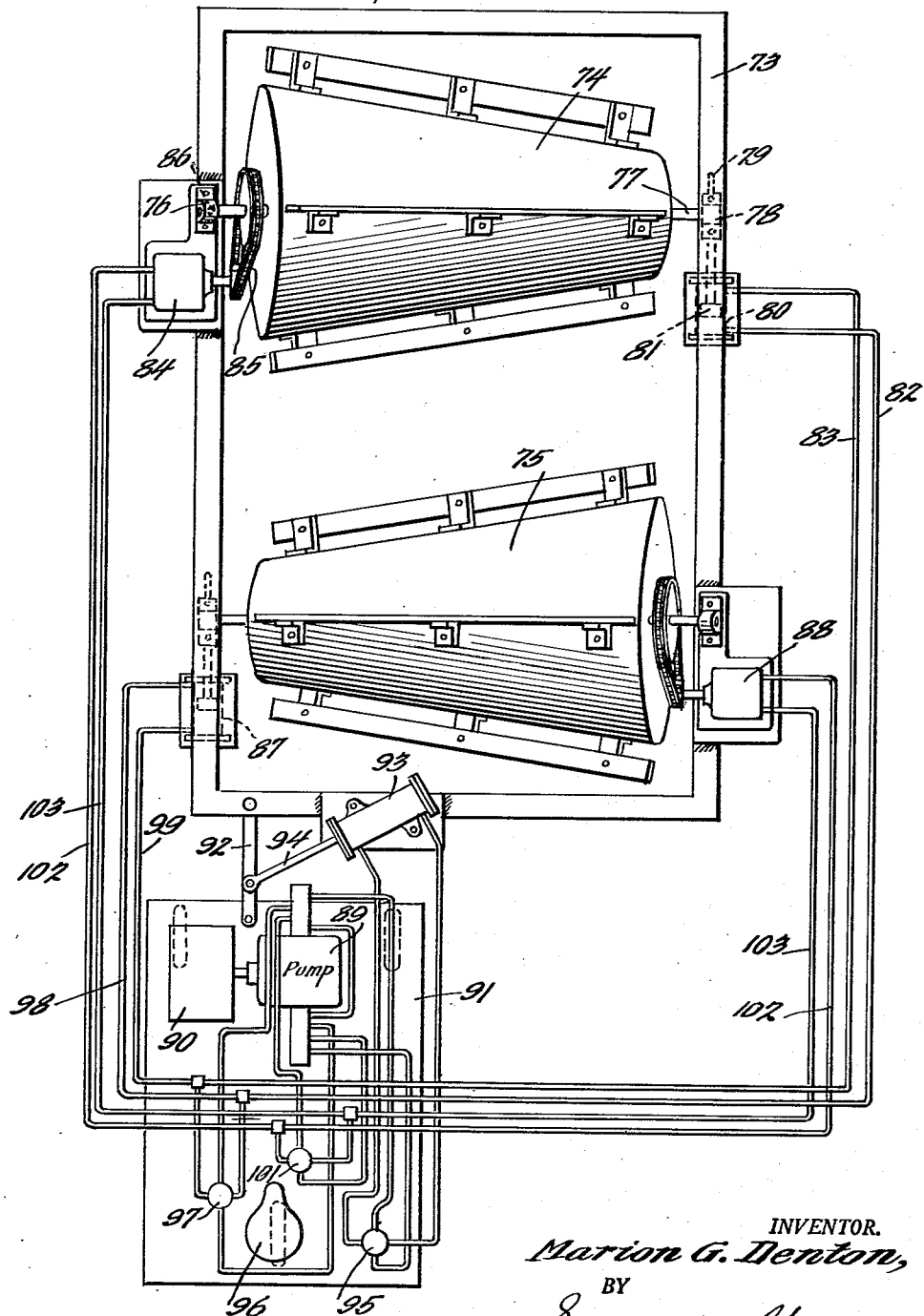

Oct. 19, 1954     M. G. DENTON     2,691,927
SELF-PROPELLED GROUNDWORKING AND CLEARING MACHINE
Filed Dec. 24, 1948     6 Sheets-Sheet 4
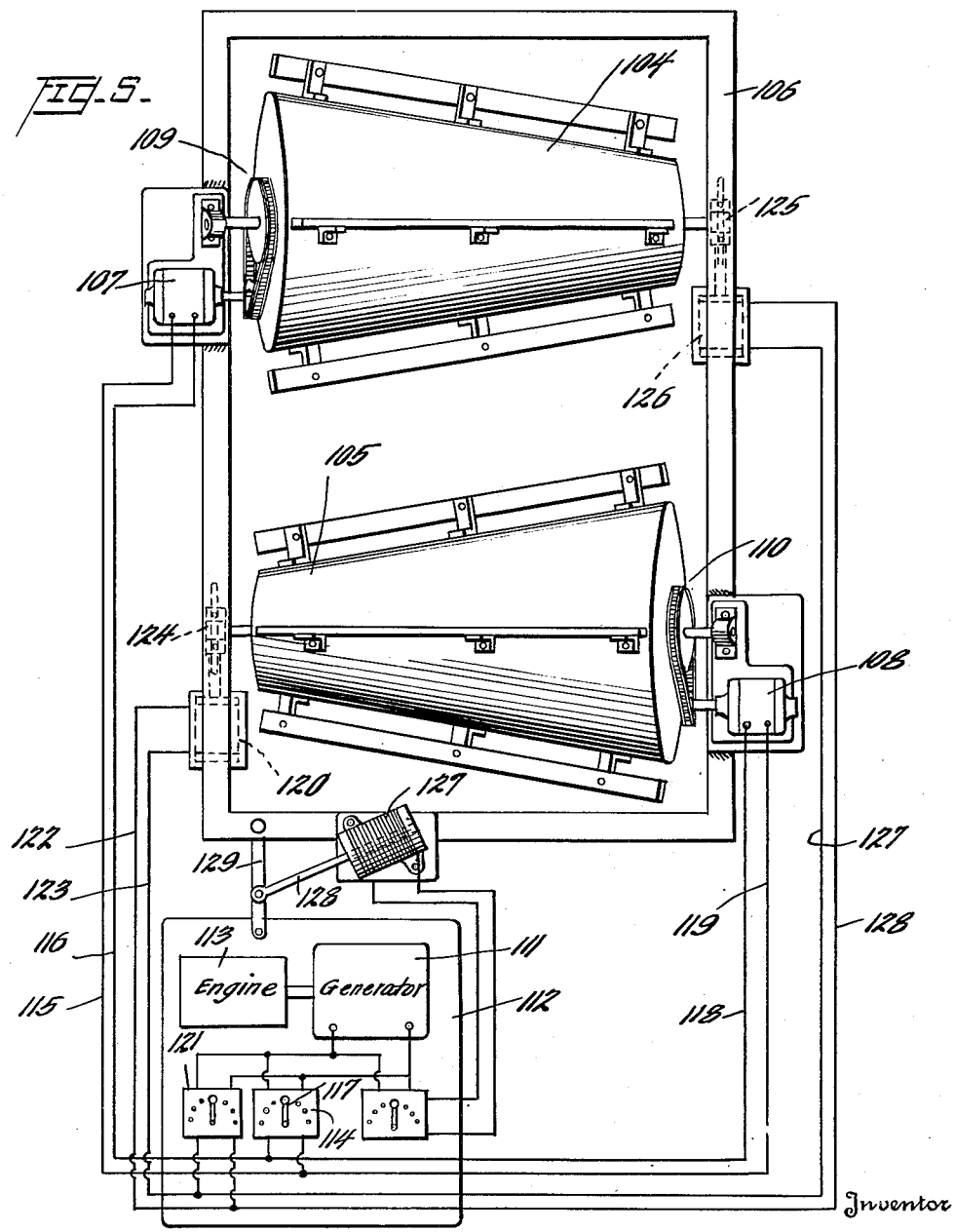

Oct. 19, 1954     M. G. DENTON     2,691,927
SELF-PROPELLED GROUNDWORKING AND CLEARING MACHINE
Filed Dec. 24, 1948     6 Sheets—Sheet 5
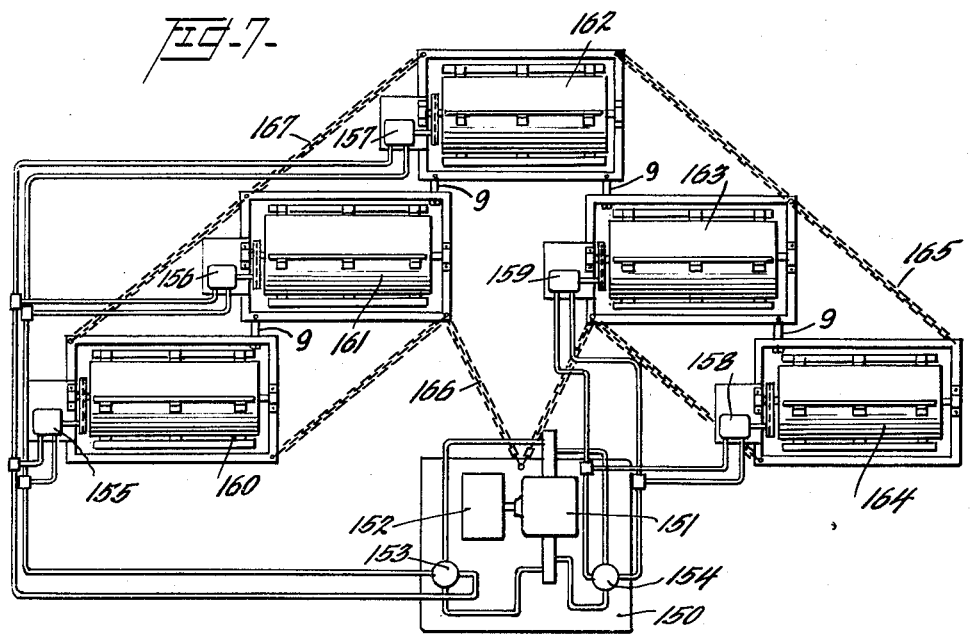
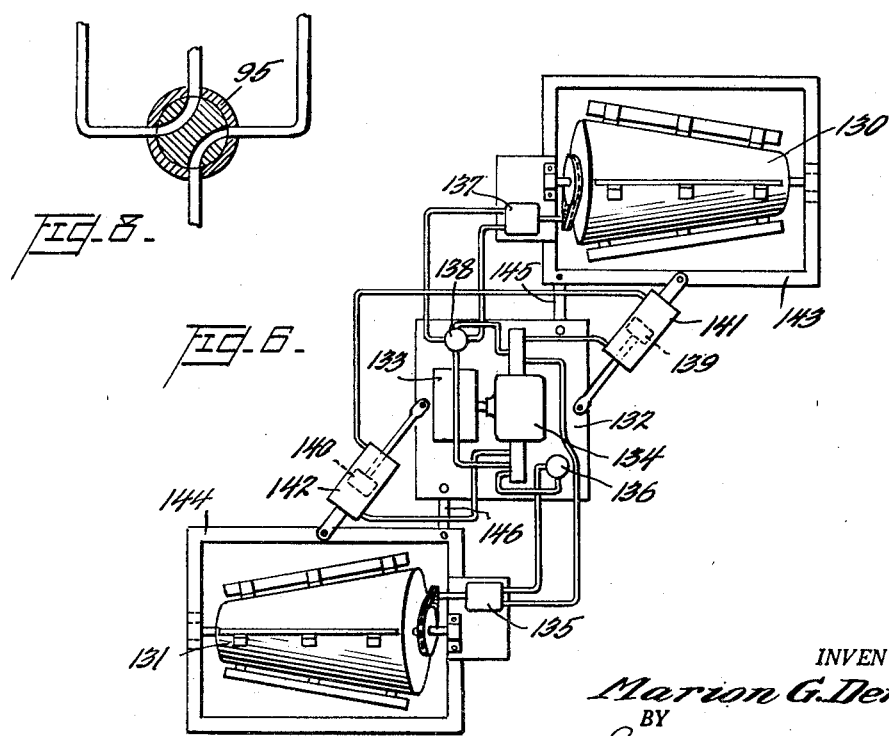
INVENTOR.
Marion G. Denton
BY
Sommers & Young
Attorneys Oct. 19, 1954   M. G. DENTON   2,691,927
SELF-PROPELLED GROUNDWORKING AND CLEARING MACHINE
Filed Dec. 24, 1948   6 Sheets-Sheet 6
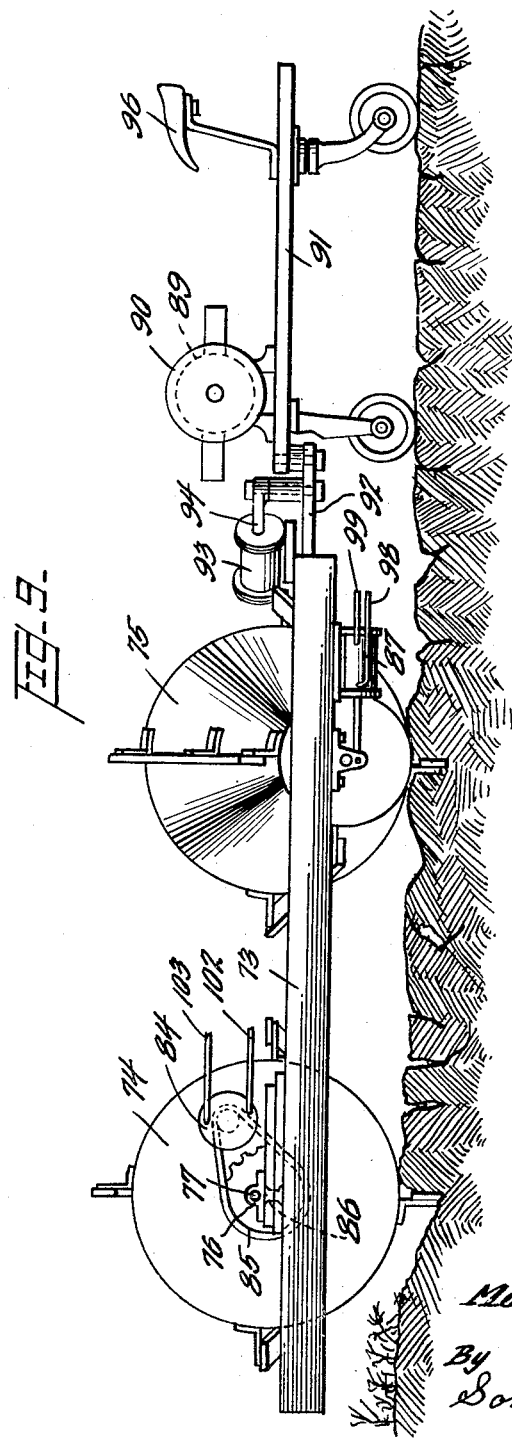
Inventor
Marion G. Denton,
By Sommers & Young
ATTORNEYS

UNITED STATES PATENT OFFICE 2,691,927

SELF-PROPELLED GROUND WORKING AND CLEARING MACHINE

Marion G. Denton, Auburndale, Fla.

Application December 24, 1948, Serial No. 67,681

26 Claims. (Cl. 97—40)

This invention relates to self-propelled ground working and clearing machines. More particularly it relates to a self-propelled machine useful for either working or clearing or for a combined operation.

In my application, Serial No. 649,309, filed February 21, 1946, now Patent No. 2,574,468, I have described and claimed a ground working machine for the purpose of cutting or chopping sticks, weeds, brush and the like and scarifying the earth, at the same time intermixing the chopped up vegetation with the earth thus stirred up. The application utilizes a plurality of rolling ground-engaging elements which are adapted for adjustment to suit conditions and to be drawn by a separate vehicle, such as a tractor. While the system disclosed in the above application has the advantage of providing a device which can be used with existing types of draft vehicles, it offers the disadvantage of requiring two separate units to perform a function which can be carried out by a single unit. In that construction the wear occasioned on the ground-engaging elements of the draft vehicle, for example, the treads of a tractor, represents a total loss causing the sole function of the draft vehicle to be the propulsion of the ground-clearing elements. The present invention aims to consolidate the draft vehicle with the ground-clearing implements into a single unit.

The main object of this invention is, therefore, to provide a self-propelled unit in which the tractive effort exerted between the ground and the ground-engaging blades performs useful work. Whereas in a unit to be drawn by a machine such as a tractor or the like, any slippage between the tractor track and the ground represents a loss in power and effort, a combination such as I now contemplate utilizes this slippage to assist the action of the cutting and stirring blades with consequent economy in use of fuel and in wear-and-tear on the machine.

Another object of the invention is to provide a self-propelled unit in which the tractive effort may be carried out electrically, mechanically or hydraulically with versatility and freedom of choice of various combinations, such as are possible with units of the invention.

Another object of the invention is to provide a machine in which the expense of a separate draft vehicle is avoided and the wear occasioned by engagement between the earth and the driving elements is confined to those elements which are actually performing useful work in breaking up vegetation or stirring up the ground, or in the simultaneous accomplishment of the two purposes.

Still another objection of the invention is to provide a unitary construction in which the propelling element is carried by the ground-engaging elements or trails behind it, as a simple mobile control unit adapted to carry the operator and the controlling mechanism only, for the ground-clearing elements.

Numerous other objects of the invention will appear from the following description when it is read in conjunction with the drawings in which:

Figure 1 is a plan view, partly in section, of a self-propelled unit embodying the invention and where the driving and controlling means is carried by the ground-engaging elements, and the elements are disposed in echelon;

Figure 1a is a diagram of Fig. 1 with the two ground-engaging elements inclined to each other;

Figure 2 is a diagrammatic view of a modified form of the apparatus shown in Fig. 1;

Figure 3 is a plan view of a modification in which the ground-engaging elements are driven hydraulically from a control unit which trails behind the ground-engaging elements;

Figure 4 is a view of a modification showing conical ground-engaging elements, and in which a hydraulic drive and control is utilized, and the hydraulic pump and control mechanism is carried by a small trailer unit which rolls behind the ground-engaging elements;

Figure 5 is a plan view of a modification in which conical ground-engaging elements are utilized and the driving and control functions are carried out electrically through a motor-generator arrangement also carried on a trailer unit;

Figure 6 is a diagrammatic view of a modification where the ground-engaging elements are actuated and controlled hydraulically from a control unit, which rolls over the ground, but is disposed between the two ground-engaging elements;

Figure 7 is a diagrammatic view of a hydraulically driven and control element employing a multiplicity of ground-engaging elements disposed in echelon and each having its own propelling mechanism, the control unit, here again, being a separate mobile unit rolling behind the ground-engaging elements;

Figure 8 is a sectional view of one type of a two-way hydraulic control valve suitable for use with the invention; and Figure 9 is a side elevation of the mechanism of Fig. 4, showing one type of self-propelled ground-breaking unit having a control unit trailing behind it.

Referring first to Fig. 1, reference characters 11 and 12 designate two cylindrical ground-engaging rolling elements or drums carrying either longitudinal, helically arranged or inclined blades on their peripheries. By way of example only, the blades are shown as being parallel to the axes of the elements and are designated 13. Drum 11, for example, carries a shaft 14 which is journaled in bearings 15 and 16 carried by the two ends of a rectangular frame 17. One end of the element 11 carries a ring gear 18 adapted to be driven through a pinion 19 carried on a shaft 20 driven through beveled gears 21 and 22, which latter are driven through a shaft 23, a differential 24, a transmission 25 and a clutch 26, connected to engine 27. The engine, the clutch and the transmission may be carried on the frame of either of the elements 11 or 12, and the operator's position is designated diagrammatically as 28 and supported on frame 17. It includes a seat 29, a clutch 26, and transmission, clutch, and engine control elements designated generally by reference character 30. Interposed between the differential 24 and the shaft 23 is a brake 31, whereby the movement of the element 11 may be controlled by the operator on the unit 28.

The element 12 is somewhat similar to element 11 but carries a ring gear 32 driven through pinion 33, bevel gears 34 and 35, universal joints 36 and 37 connected by shaft 38, and brake 39 carried by a shaft 40 connecting the differential 24 with the universal joint 37. The unit 12 includes the frame 41 in which supporting shaft 42 is journaled. The frames 17 and 41 are connected by strut or pivoted link means 9, which allows relative inclination between the frames in the horizontal direction but prevents relative overturning movements of the respective frames about their respective axes.

As shown in Fig. 1, the axes of the two units 11 and 12 are shown as parallel, but they can be inclined with respect to each other, as shown in Fig. 1a, by actuation of the chain 43 through sprocket 44 and adjusting handle 44' together with suitable locking means associated with the sprocket. The two ends of the chain are rigidly connected to the frame 41, as at 45 and 46, and pass around the guide rollers 47 and 48 on the corners of frame 17. As will be understood, this adjustment of the inclination between the two elements 11 and 12 may be carried out when the unit is stationary or when the unit is in motion. It is possible, because of the presence of universal joints 36 and 37, and permits a variety of different modes of action when the unit is in motion and the disposition of the elements in echelon facilitates accurate steering control.

The operation of the mechanism shown in Fig. 1 will be understood from the past description, but will be reviewed briefly for clarity. With the adjustment of the chain 43 carried out as desired, and with the clutch 26 disengaged, the operator starts the engine 27, seats himself at 29, and then after selecting the proper gear 25, engages the clutch whereupon the unit is propelled forward by direct action between the drive shaft 23 to the ring gear 18 of unit 11, and through universal joints 36 and 37 and shaft 38 to the ring gear 32 on unit 12. The blades 13 engage and tear up the ground, and cut and chop any vegetation which stands above the surface of the ground. The amount of this cutting and breaking action is determined not only by the amount of power applied but also by the angularity between the blades on the two units 11 and 12. It is possible for the operator during the forward motion of the vehicle to steer the unit by controlling the brakes 31 and 39, that is, loosening one and tightening the other or vice versa. The universal joints 36 and 37 permit the drive to be carried out in spite of unevenness of the ground or in spite of the engagement of the unit with obstacles on the surface of the ground. Consequently, all of the power applied to the blades 13 is utilized effectively and efficiently in cutting and chopping trees, weeds and other vegetation, in breaking up the ground and in mixing and stirring the broken pieces of vegetation into the ground so broken.

The method of drive illustrated is one of known form where a differential is included. Obviously, equivalent forms of drive may be substituted including those wherein the differential is omitted.

It will be understood that the transmission 25 and other driving and control elements are of well-known construction and, since their details do not constitute a part of the present invention, they are described in general terms only.

Figure 2 shows a form of the invention generally similar to that shown in Fig. 1 except that the parts of the mechanism are driven and controlled hydraulically instead of mechanically. Referring now to Fig. 2, reference characters 50 and 51 represent, respectively, ground-engaging elements carried by movable frames as in the device of Fig. 1, the frame for element 50 being designated 52 and that for element 51, being designated 53.

The mechanism shown in Fig. 2 is designed to provide complete hydraulic control, for steering purposes, for propulsion purposes, and for changing the angularity of the elements, and while the mechanism employed may take various forms, representative parts are indicated in this view, as will be pointed out. The frame 53 carries a platform 54 which may support not only the operator of the device, but also an internal combustion engine 55 driving hydraulic pump 56 which, through suitable piping and control valves, causes operation of the elements 50 and 51 through fluid motors 57 and 58, respectively. The element 50, for example, has a shaft 59 which is supported at one end in a bearing 60 which is fixed on the frame 52. The other end of the shaft 59 is supported in a bearing 61 and a driving connection consisting, for example, of chain and sprockets designated generally as 62, supplies the drive between the shaft of motor 57 and the shaft 59. In practice, of course, the pump 56 will be associated with a suitable type of oil sump or reservoir which is omitted from the drawing for purposes of simplification. The flow of fluid from the pump 56 to the motor 57 is controlled by a valve 63 and, similarly, a valve 64 controls the supply of fluid from the pump to the motor 58 which drives the element 51 through a chain and sprocket arrangement 65 similar to that shown in connection with element 50.

Since controls of this type are well-known, it is sufficient to say that the arrangement is such that fluid under pressure may be supplied by proper positioning of valves 63 and 64 to the turbines 57 and 58 to propel the elements 50 and 51. Control may be exercised by positioning of the valves 63 and 64 to control the amount of fluid supplied to the fluid turbines. The control means is not shown since it is well-known.

The steering of the unit can be accomplished by varying the relative speeds of the elements 50 and 51. For example, in turning to the left the supply of fluid to motor 57 may be cut off or reversed, while the supply to motor 58 is continued. Similarly in turning to the right the procedure mentioned is reversed by continuing the supply of fluid to motor 57, and cutting off or reversing the supply to motor 58.

Hydraulic cylinders 66 and 67 to which fluid may be supplied or from which it may be discharged through the pipes indicated are utilized to change the angularity between the elements. For example, the cylinder 66 is rigidly connected to frame 52 as at 68. The piston within cylinder 66, and indicated diagrammatically, is connected through a chain 69 to a fixed point on frame 53. Similarly, the cylinder 67 is secured to frame 52 at 70 and the piston within cylinder 67 is connected to frame 53 as at 71. When fluid under pressure is supplied to these cylinders 66 and 67 in properly coordinated manner, the angularity between the two elements 50 and 51 may be varied within the limits of travel of those elements as provided by the connections to frames 52 and 53. Except for the precise manner of control, the operation of the device shown in Fig. 2 is similar to that which has already been described in connection with Fig. 1.

Fig. 3 shows another type of hydraulic arrangement differing essentially from that of Fig. 2 by the fact that the control mechanism, including the pump and the engine which drives it, is carried by a small trailer 72 which is flexibly connected to the frame of the rear rolling element and is drawn by it as the two rolling elements are propelled forward by the fluid motors supplied with fluid. Inasmuch as the structure of Fig. 3 corresponds essentially to that of Fig. 2, the same reference characters have been employed in the two figures in order to simplify the description and illustration.

The advantage of the arrangement shown in Fig. 3 will be apparent in several ways. For example, where the control elements trail behind the rolling elements, it is not necessary for the rolling elements to carry the weight of the control mechanism nor is it necessary to encounter the difficulty of balancing the weights of the parts properly. In other words, the rolling elements may be disposed as convenience dictates and without regard to the controlling mechanism on the trailer except to provide the necessary flexible connection between the trailer and the frame of one rolling element, and the necessary flexible connections in the fluid lines which supply the motors and control cylinders of the unit.

So far, it has been indicated in this description that the ground-engaging elements are of cylindrical contour but may be conical with various arrangements. One such arrangement where conical rolling elements are provided is shown in Fig. 4 of the drawing still utilizing hydraulic driving and control mechanism. It may be pointed out that whereas cylindrical elements must be laterally displaced from one another, that is, may be disposed in echelon, when positively driven, in order to counteract their tendency to turn continuously in one direction, this is not true of conical elements. By arranging conical elements in reversed relation, as in Fig. 4, the tendency of element 74 to turn to the right is overcome by the inherent tendency of element 75 to turn to the left. Thus an arrangement of this character permits placing one element directly behind the other and makes the unit move in a straight line when both elements are driven at the same speed.

Referring now to Fig. 4, reference character 73 designates a frame unit constructed to support and guide ground-engaging elements designated 74 and 75, respectively. The element 74, for example, carries at one end a pivoted bearing 76 in which the shaft 77 of the element is journaled. Bearing 78 is supported on one of the side rails of frame 73 and moves in a guide slot 79, adjustment being provided for through a hydraulic cylinder 80 containing a movable piston 81 which is connected to the bearing 78. When fluid is supplied to the cylinder 80 as through pipe 82, the bearing 78 is moved forwardly thereby changing the angularity of shaft 77 and the element carried by it with respect to frame 73. Supplying hydraulic fluid to the cylinder 80 through pipe 83 would move the element 74 rearwardly in similar manner.

As indicated above, the element 74 is driven by fluid motor means indicated 84, and a chain and sprocket 85; this drive not being disturbed by adjustment of bearing 78 since the bearing 76 is pivoted on the frame, as indicated at 86.

The rolling element 75 is mounted similar to the manner just described and may have its angularity adjusted through piston 87, and is driven through a turbine 88. Although the introduction of such relative angularity between the elements would tend to turn the machine and may even be utilized for steering the machine, this tendency to turn may be overcome by varying the relative drive of the respective elements.

Hydraulic fluid for the motors 84 and 88, and the cylinders 80 and 87, is delivered from a pump 89 driven by means, such as an engine 90, carried by a mobile trailer unit 91 which is disposed behind the frame 73 and pivotally connected to it through a link 92 as shown in Fig. 9. A hydraulic cylinder 93 supported by the frame 73 has its piston connected to link 92 through rod 94. Through this means and by control of two-way valve 95, pressure fluid may be supplied to or exhausted from the cylinder 93 in such manner as to vary the angular position of the trailer unit with respect to the main ground-clearing unit. The trailer, in addition to the pump and engine, carries a seat 96 for the operator, and the piping under the control of valve 97, connected to pipes 82, 83, 98 and 99 to operate the mechanism associated with cylinders 80 and 87. Also, valve 101 controls the supply to an exhaust from pump 89 to the motors 84 and 88 through lines 102 and 103.

It will be clear that so far as operation is concerned, the mechanism of Fig. 4 is generally similar to that of Fig. 3 except that hydraulic means is provided for varying the relative position of the trailer unit to that of the main unit. As in Fig. 3 the steering of the unit is accomplished by control of the elements 74 and 75 through motors 84 and 88.

A unit of this type where the power supply and control means is mounted on a rear trailer is especially valuable in clearing and ground working of orchards where over-hanging limbs make the use of high machines impractical. With the machine illustrated the position of the trailer can be varied so that the rolling elements can operate close to the trunk of any tree while the operator on the trailer is at some distance away and out of reach of the limbs of the tree. By exercise of control through cylinder 93 it is possible to reach places which were heretofore inaccessible by machines and could only be cultivated by hand. The many advantages of the new arrangement are obvious.

It has been pointed out in detail above that mechanism of the type under consideration can be propelled and controlled either mechanically or hydraulically. It is also possible to exercise this drive and control electrically and, in Fig. 5, one form of mechanism for exercising such electrical drive and control is illustrated.

Referring now to Fig. 5, reference characters 104 and 105 designate conical rolling ground-engaging elements similar to those of Fig. 4 and carried in a main rectangular frame 106. Here the elements 104 and 105 are driven, respectively, by electric motors 107 and 108 through a chain and sprocket mechanism designated 109 and 110. Energy is supplied to the motors 107 and 108 from an electric generator 111 carried by a trailer unit 112, the generator being driven by means such as internal combustion engine 113. The output from generator 111 supplies current to the motor 107, for example, through a rheostat 114 connected to wires 115 and 116. The amount of current supplied to motor 107 is determined by the position of rheostat arm 117. Similarly, control of current to motor 108 is accomplished simultaneously over wires 118 and 119 when rheostat arm 117 is adjusted.

In connection with Fig. 4, it has been pointed out how the angularity of the two rolling elements with respect to the supporting frame may be changed hydraulically. In electric control a similar mechanism is utilized wherein electric solenoids take the place of the hydraulic cylinders of Fig. 4. In Fig. 5, for example, solenoid 120 is under the control of rheostat 121 over line wires 122 and 123. The core of solenoid 120 may be moved in or out to vary the position of bearing 124. Simultaneously, with adjustment of bearing 124, bearing 125 is adjusted through solenoid 126, which is supplied with current from rheostat 121 over line wires 127 and 128.

The unit shown in Fig. 5 is steered electrically by means equivalent to those shown in Fig. 4, by varying either the relative angularity of the elements or the drive exercised by the electric motors 107 and 108. A solenoid 127 carried by the rear of frame 106 serves to vary the relative positions of the trailer unit and the ground-working unit. The core of solenoid 127 is connected by rod 128 to a link 129 connecting the rear end of frame 106 with the frame of trailer 112.

Still another feasible arrangement for hydraulic control is that shown in Fig. 6 wherein conical rolling elements 130 and 131 are disposed laterally with respect to each other and having a separate rolling control element disposed between them. This control element comprises the unit 132 carrying an engine 133 and hydraulic pump 134. The pump may supply fluid to a fluid motor 135 to drive the element 131, control being exercised through a valve 136. Similarly, the element 130 may be driven by a fluid motor 137 under the control of a valve 138. The angularity between the two elements 130 and 131 may be varied by positioning the pistons 139 and 140 within the cylinders 141 and 142. The cylinder 141 is secured to the frame 143 of element 130, and the piston 139 is connected to the frame of mobile unit 132. Similarly, the cylinder 142 is connected to the frame 144 of element 131, and the piston 140 is connected to the frame of mobile unit 132. Suitable control of the supply of pressure fluid to the cylinders 140 and 141 determines the relative positions of the two elements 130 and 131.

As shown, the mobile unit 132 is pivotally connected to frame 143 by the link 145, and frame 144 of element 131 is connected to the frame of trailer unit 132 through link 146. For steering the machine a relative condition of operation of the respective elements may be altered, that is, their relative angularity, or, the amount of drive applied to the respective elements, of both. It will be understood that variation in the relative angular position of the two elements 130 and 131 may be relied upon to steer the unit and to control its line of movement, and that steering may also be accomplished through control of motors 135 and 137. In practice it is preferred for best results to control both the motors 135 and 137 and the cylinders 142 and 141.

In all of the structures so far described, two rolling elements only are employed to clear and break up the ground. It is possible within the purview of the present invention to employ a multiplicity of these elements disposed in echelon and all controlled from a single mobile unit. Such an arrangement is indicated in Fig. 7 wherein a mobile unit 150 carries hydraulic pumping means 151, an engine 152 to drive it, a control means in the form of valves 153 and 154 for controlling the supply of control fluid to a plurality of fluid motors 155, 156, 157 under the control of valve 153, and fluid motors 158 and 159 under the control of valve 154. In this way, all of the rolling elements 160, 161, 162, 163 and 164 are driven individually being held in fixed angular relation by pivoted strut or link means 9 and flexible connecting means such as chains 165, 166 and 167 connected to the respective frames of the rolling elements as indicated in Fig. 7 of the drawing. The valves designated 153 and 154 may be of the type indicated in Fig. 8, this being representative of a type of two-way valve which may be used in the various forms of hydraulic system disclosed and described herein.

The steering of the multiple unit shown in Fig. 7 may be carried out by suitable control of the right and left hand elements. For example, in turning to the left motors 155, 156 and 157 may be stopped or reversed, while motors 158 and 159 are driven. In turning to the right motors 158 and 159 may be stopped or reversed, and motors 155, 156 and 157 driven. The trailer unit 150 being flexibly connected to the driven elements will trail in appropriate position.

It will be understood that the mechanism shown and described is merely exemplary of a few types of mechanism which may be employed for the purpose intended. Obviously, the specific type of mechanism employed may be varied within wide limits so long as the major purpose of the invention is attained. Machines of the type to which this invention relates are used in a variety of locations and under widely varying circumstances and it is for that reason that the various forms of mechanism have been illustrated so as to point out the flexibility of the scheme and its wide and general application to the clearing and breaking up of land, particularly where it is to be converted from waste land to tilled land.

It is to be understood that in all of the types of mechanism illustrated the power applied is utilized directly in the clearing and breaking of the soil and without loss due to poor traction. Any wear which is occasioned on the ground-engaging elements is exhausted by the frictional work expended between the element and the ground and is, therefore, used effectively. Although only a few forms of the invention have been described and illustrated, it is to be understood that various changes and modifications may be made within the scope of the appended claims without departing from the spirit and scope of the invention.

In each of the embodiments herein disclosed as exemplary of the invention, the machine is complete itself, that is to say, it is not intended to be driving means for some other machine nor is it required to be supplied with other draft means for propelling it over the ground. Furthermore, in every embodiment the frame means whether constituted by a single frame containing a plurality of rolling elements, or of a plurality of frames, each containing a single rolling element, but connected to one or more other frames, is entirely stable against overturning about the axes of the rolling element.

What is claimed is:

1. A self-propelled ground clearing and working machine, comprising a plurality of elongated rolling elements which roll over the ground in operation, said rolling elements being provided with ground working blades attached to their outer surfaces and extending substantially in the direction of the axes of the rolling elements throughout a substantial part of their lengths, means connecting said rolling elements together in definite relationship with one of said rolling elements located rearwardly of another whereby said connecting means is entirely dependent upon itself and said rolling elements for support against overturning around the axes of the rolling elements, power producing means, individual driving means for connecting the power producing means with each rolling element at locations spaced smaller distances from the axes of the rolling element than the blades so as to avoid interference with the blades in operation, and means for altering a characteristic of the relative driving of the rolling elements for steering the machine.

2. A self-propelled ground clearing and working machine comprising a plurality of elongated rolling elements having longitudinally extending ground breaking blades located on their peripheries and extending substantial distances along said elements, frame means connecting said elements in tandem whereby said frame means is entirely dependent upon itself and said rolling elements for support against overturning around the axes of the rolling elements, means for adjusting said elements so that the ground breaking blades of one rolling element are inclined with respect to the blades of the other, and power means for propelling said rolling elements by application of power directly to the ends of said elements beyond the ends of said blades and exerting its tractive and steering effort solely through said blades, and drive control means for altering the drive applied to the respective rolling elements for steering the machine.

3. A self-propelled ground clearing and working machine, comprising, a plurality of elongated rolling elements having a plurality of ground breaking blades extending substantial distances longitudinally in the general direction of the axes of the respective rolling elements and located at angularly spaced positions around the rolling elements, said blades having their flat surfaces arranged substantially radially with respect to the axes of the respective rolling elements, means connecting said rolling elements to one another and holding them in controlled relationship, with one of said rolling elements located rearwardly of another whereby said connecting means is entirely dependent upon itself and said rolling elements for stability against over-turning around the axes of the rolling elements, power producing means attached to said rolling elements, power transmitting means interconnecting the power producing means with the rolling elements, and power transmission control means for varying the application of power to said elements individually for steering the machine.

4. A self-propelled ground clearing and working machine, comprising a plurality of elongated rolling elements having ground breaking blades on their circumferences, said blades extending substantial distances longitudinally in the general direction of the axes of the respective rolling elements, and being located at angularly spaced positions around the rolling elements, and having their flat faces arranged substantially radially, means connecting said rolling elements to one another and holding them in controlled relationship, with the centers of the rolling elements spaced laterally on opposite sides of the center of the machine and with one rolling element located rearwardly of another, said connecting means being entirely dependent upon itself and said rolling elements for stability against overturning around the axes of the rolling elements, means for producing power for driving said rolling elements individually, power transmission means connecting the power means with the rolling elements, beyond the ends of the blades so as to avoid interference with the blades as the rolling elements turn, and means for controlling and altering the power supplied to the respective rolling elements to guide the machine without changing the angle between the axes of the respective rolling elements.

5. A self-propelled ground clearing and working machine, comprising a plurality of elongated rolling elements having ground breaking blades on their circumferences, said blades extending substantial distances longitudinally in the general direction of the axes of the respective rolling elements, and being located at angularly spaced positions around the rolling elements, and having their flat faces arranged substantially radially, means connecting said rolling elements to one another and holding them in controlled relationship, with the centers of the rolling elements spaced laterally on opposite sides of the center of the machine and with one of said rolling elements located rearwardly of another, whereby said connecting means is entirely dependent upon itself and said rolling element for stability against overturning around the axes of the rolling elements, means for producing power for driving said rolling elements individually, power transmission means connecting the power producing means with the rolling elements closer to the respective rolling element axes than the positions of the blades, so as to avoid interference with the blades as the rolling elements turn, and means for controlling and altering the power transmission to the respective rolling elements to guide the machine without changing the angle between the axes of the respective rolling elements.

6. A self-propelled ground clearing and working machine, comprising a plurality of elongated rolling elements having ground breaking blades on their circumferences arranged angularly spaced apart and extending substantial distances in the directions of the axes of the respective rolling elements, means connecting said rolling elements to one another and holding them in controlled relationship, with the axes of the individual rolling elements located laterally of the center of machine and with one rolling element located rearwardly of another, whereby said connecting means is entirely dependent upon itself for stability against overturning around the axes of the rolling elements, means for adjusting said connecting and holding means of said rolling elements so that the axis of rotation of one rolling element is inclined with respect to the axis of rotation of the other, means for producing power for propelling said rolling elements, power transmission means for transmitting power from the producing means to said rolling elements, and power transmission control means for altering the application of power to the respective rolling elements for steering the machine.

7. A self-propelled ground clearing and working machine, comprising a plurality of elongated rolling elements having ground breaking blades on their circumferences, extending substantial distances longitudinally thereof, means connecting said elements to one another and holding them in controlled relationship, with the axes of the individual rolling elements located laterally of the center of machine and with one rolling element located rearwardly of another, whereby said connecting means is entirely dependent upon itself for stability against overturning around the axes of the rolling elements, means for adjusting said connecting and hold-means of said elements so that the axis of rotation of one rolling element is inclined with respect to the axis of rotation of the other, power producing means, means for transmitting power from the power producing means to the rolling elements for propelling the machine, said transmitting means being connected to the ends of the rolling elements so as not to obstruct movement of the blades during rolling of said elements, and means for altering the application of power to the respective rolling elements for controlling the direction of movement of the machine.

8. In an agricultural earth working machine, a plurality of elongated rolling elements having ground-engaging blades located radially spaced from the axes of rotation of said elements, and angularly spaced from each other around the said respective axes of rotation, said blades extending substantial distances in the general direction of the axes of the respective rolling elements, a prime mover transported by said elements and drivingly connected thereto at their endns beyond the ends of the blades for rolling them over the ground, means connecting said rolling elements together in predetermined relative positions and directions, with the centers of said rolling elements located laterally of the center of the machine and with one of said rolling elements located rearwardly of another, whereby said connecting means is entirely dependent upon itself and said rolling elements for stability against overturning around the axes of the rolling elements, the said directions being angularly disposed with respect to the direction in which the machine moves in operation by the joint effect of the plurality of rolling elements, whereby the slippage resulting between the blades and the earth engaged thereby results in useful working of the earth, and means for altering the application of power to the respective rolling elements to steer the machine.

9. A self-propelled ground clearing and working machine, comprising a substantially rectangular frame, a pair of elongated rolling ground-engaging cone-shaped elements journaled in said frame, one behind the other, ground cutting blades on the peripheries of said elements, said blades extending substantial distances in the general direction of the axes of the respective rolling elements, a common means providing power for driving said elements to simultaneously propel the machine and work the ground by the action of said cutting blades, means for transmitting the driving power from said power means to said elements, and means for altering the drive of the respective elements to steer the machine.

10. A self-propelled ground clearing and working machine, comprising a substantially rectangular frame, a pair of rolling ground-engaging cone-shaped elements journaled in said frame, one behind the other, ground cutting blades on the circumstances of said elements, angularly spaced apart and extending longitudinally of said elements, a trailer disposed behind and connected to said frame, a power supply on said trailer, driving means connected to each of said elements at their end beyond the ends of the blades, means for transmitting a power medium from said power supply on said trailer to the driving means for said elements, and means on said trailer for altering the supply of power to the respective elements to steer the machine.

11. A self-propelled ground clearing and working machine according to claim 9 and in which the driving means for said elements are mechanical.

12. A self-propelled ground clearing and working machine, comprising a plurality of elongated cylindrical rolling elements connected in echelon, ground cutting blades mounted on the circumferences of said elements in angularly spaced relation and extending substantial distances longitudinally thereof, frame means in which said elements are journaled, a prime mover carried by said frame means and having driving connection with each of said rolling elements at their ends beyond the ends of the blades, and means for altering said driving connections for actuating said elements selectively to steer said machine, said frame means, due to one of said elements being located rearwardly of another in the echelon arrangement, being entirely dependent upon itself and said rolling element for stability against overturning about the axes of said rolling elements.

13. A self-propelled ground clearing and working machine, comprising a plurality of elongated cylindrical rolling elements connected in echelon, ground cutting blades mounted on the peripheries of said elements, in angularly spaced relation and extending substantial distances longitudinally thereof, frame means in which said elements are journaled, said frame means being entirely dependent upon itself and said rolling element for stability against overturning about the axes of said rolling elements, trailer means connected in rear of said frame means, a prime mover carried by said trailer, power transmitting connections between the trailer and the rolling elements, and means for altering the application of power to the respective elements to steer the machine.

14. A self-propelled ground clearing and working machine, comprising a plurality of elongated cylindrical rolling elements connected in echelon, ground cutting blades mounted on the peripheries of said elements, in angularly spaced relation and extending substantial distances longitudinally thereof, frame means in which said elements are journaled, said frame means, due to one of said elements being located rearwardly of another in the echelon arrangement, being entirely dependent upon itself and said rolling elements for stability against overturning about the axes of said rolling elements, hydraulic actuating means carried by said frame means, trailer means connected in rear of said frame means, hydraulic fluid supply means on said trailer, fluid transmitting means between said supply means and said hydraulic means, and means for controlling the fluid transmitting means to vary the drive of said actuating means individually to steer the machine.

15. A self-propelled ground clearing and working machine, comprising a plurality of elongated cylindrical rolling elements connected in echelon, ground cutting blades mounted on the peripheries of said elements, in angularly spaced relation and extending substantial distances longitudinally thereof, frame means in which said elements are journaled, said frame means, due to one of said elements being located rearwardly of another in the echelon arrangement, being entirely dependent upon itself and said rolling elements for stability against overturning about the axes of said rolling elements, hydraulic actuating means carried by said frame means, trailer means connected in rear of said frame means, hydraulic fluid supply means on said trailer, fluid conducting means extending between said supply means and said hydraulic actuating means, hydraulic means for varying the angular relation between the trailer and the frame means, and control means on said trailer for controlling said hydraulic actuating means, said hydraulic supply means, and said angular relation varying means.

16. A self-propelled ground clearing and working machine, comprising a plurality of elongated conical rolling elements, ground cutting blades mounted on the peripheries of said elements, in angularly spaced relation and extending substantial distances longitudinally thereof, frame means in which said elements are journaled, one of said rolling elements being located rearwardly of another, whereby said frame means is entirely dependent upon itself and said rolling elements for stability against overturning about the axes of said rolling elements, an electric motor for driving each of said elements, trailer means connected in rear of said frame means, an electric generator and driving means therefor mounted on said trailer means, flexible means for supplying current from said generator to the motors of said elements, and means on said trailer for controlling the drive of said electric motors to alter the application of power to said elements individually to steer the machine.

17. A self-propelled ground clearing and working machine, comprising a plurality of elongated conical rolling elements, ground cutting blades mounted on the peripheries of said elements, in angularly spaced relation and extending longitudinally thereof, frame means in which said elements are journaled, one of said rolling elements being located rearwardly of another, whereby said frame is being entirely dependent upon itself and said rolling elements for stability against overturning about the axes of said rolling elements, an electric motor for driving each of said elements, trailer means connected in rear of said frame means, an electric generator and driving means therefor mounted on said trailer means, flexible means for supplying current from said generator to the motors of said elements, electric means for varying the angular relation between said trailer and said frame means, electric means for altering the angular relationship between the rolling elements and said frame means, and means on said trailer for controlling said electric means and said electric motors to vary the drive applied to the rolling elements to steer the machine.

18. A self-propelled ground clearing and working machine, comprising a frame having a plurality of elongated conical rolling elements journaled therein in reversed relation to and in line with one another, and supporting said frame, one of said rolling elements being located rearwardly of another whereby said frame is entirely dependent upon itself and said rolling elements for stability against overturning about the axes of said rolling elements, said elements having radially disposed blades located in angularly spaced-relation about said elements and extending substantial distances longitudinally thereof, fluid motors for driving said elements selectively, hydraulic means for varying the angularity between the axes of said elements, trailer means connected in rear of said frame, a source of hydraulic pressure fluid on said trailer means, flexible fluid supply connections between said source and said motors and said hydraulic means on said frame, and means on the trailer means for controlling the application of power to said motors and to said hydraulic means to steer the machine.

19. A self-propelled ground clearing and working machine, comprising a frame having a plurality of elongated conical rolling elements journaled therein in reversed relation to one another, one of said elements being in rear of the other of said elements supporting said frame, whereby said frame is entirely dependent upon itself and said rolling element for stability against overturning about the axes of said rolling element, said elements having radially disposed blades located in angularly spaced-relation about said elements and extending substantial distances longitudinally thereof, fluid motors for driving said elements selectively, hydraulic means for driving said elements selectively, hydraulic means for varying the angularity between said elements, trailer means connected in rear of said frame, hydraulic means for varying the angular relation between said trailer means and said frame, a source of hydraulic pressure fluid on said trailer means, flexible fluid supply connections between said trailer means and the hydraulic motors and hydraulic means on said frame, and means on the trailer means for selectively controlling the motors, and the two hydraulic means to steer the machine.

20. A self-propelled ground clearing and working machine, comprising a frame having a plurality of elongated conical rolling elements journaled therein in reversed relation to one another and one behind the other, and supporting said frame, whereby said frame is entirely dependent upon itself and said rolling element for stability against overturning about the axes of said rolling element, said elements having radially disposed blades located in angularly spaced-relation about said elements and extending substantial distances longitudinally thereof, electric motors for driving said elements, electric means for varying the angularity between the axes of said elements, trailer means connected to the rear of said frame, a source of electric current on said trailer means, flexible electric supply means between said source and the electric motors and the electric means on said frame, and means on the trailer means for controlling said motors and said electric means for steering the machine.

21. A self-propelled ground clearing and working machine, comprising a frame having a plurality of elongated conical rolling elements journaled therein in reversed relation to one another, one of said rolling elements being arranged rearwardly of another, said elements supporting said frame, whereby said frame is entirely dependent upon itself and said rolling element for stability against overturning about the axes of said rolling element, said elements having radially disposed blades located in angularly spaced-relation about said elements and extending substantial distances longitudinally thereof, electric motors for driving said elements, electric means for varying the angularity between said elements, trailer means connected to the rear of said frame, electric means for varying the angular relation between the trailer means and the frame, a source of electric current on said trailer means, flexible electric supply means between said source and the electric motors and electric means on said frame, and means on the trailer means for controlling said motors and said electric means for steering the machine.

22. A self-propelled agricultural machine, comprising a plurality of elongated rolling elements having ground engaging blades secured thereto, said blades extending substantial distances in the directions of the axes of the respective elements, being arranged in angularly spaced relation about the axes of said elements, and having their flat faces extending approximately radially with respect to the respective axes, frame means maintaining said elements deployed with the centers of the elements arranged laterally of the center of the machine and with one of said rolling elements rearwardly of another, whereby said frame means is entirely dependent upon itself and said rolling elements for support against overturning around the axes of said rolling elements, power producing means transported by the machine, power transmitting means for transmitting power from said producing means to said rolling elements to turn said elements so that any slippage of said rolling elements with respect to the ground is converted into useful work through said blades engaging the ground, said power transmitting means applying the power to said rolling elements from beyond the ends of said blades, and power transmission control means for altering the power applied to the respective rolling elements for steering the machine.

23. A self-propelled agricultural machine, comprising at least three elongated rolling elements, said rolling elements being provided with ground engaging blades extending substantially radially from the outer surfaces of said elements and extending substantially in the directions of the axes of the respective rolling elements throughout substantial distances lengthwise of said rolling elements, said blades being spaced apart circumferentially around said rolling elements, individual frame means rotatably mounting each said rolling element, said individual frame means being pivotally connected together and arranged in echelon with at least one of said rolling elements located rearwardly of another and with some of said rolling elements disposed laterally of the central axis of the machine, whereby said frame means are entirely dependent upon themselves and said rolling elements for support against overturning around the axes of said rolling elements, power producing means transported by said machine, driving means connected to at least one of said rolling elements radially inwardly of the blades thereof so as not to interfere with said blades in operation, power transmission means for transmitting power to said driving means, and means for altering a condition of operation of one of said rolling elements located laterally of the central axis of the machine for steering the machine.

24. A self-propelled agricultural machine, comprising a plurality of elongated conical rolling elements, ground-engaging blades secured on said elements and extending axially thereof, said blades being located at angularly spaced positions around said elements, and having their flat faces disposed axially relative to the axes of the respective elements, said blades extending substantial distances along said elements, frame means in which said elements are journaled for rotation, said frame means holding said elements in predetermined relative positions with one of said rolling elements located rearwardly of another and at selected angles relative to each other, power producing means transported by said machine, power transmitting means for transmitting power from said producing means to said elements to cause said elements to roll, means for altering the angles between the axes of said rolling elements to steer the machine, said frame means, by reason of the location of one rolling element rearwardly of another, being entirely dependent upon itself and said rolling elements for support against overturning around the axes of said rolling elements.

25. A self-propelled agricultural machine, comprising a plurality of elongated conical rolling elements, ground-engaging blades secured on said elements and extending substantial distances axially thereof, said blades being located at angularly spaced positions around said elements and having their flat faces disposed axially relative to the axes of the respective elements, frame means in which said elements are journaled for rotation, said frame means holding said elements in predetermined relative positions with one of said rolling elements located rearwardly of another and at selected angles relative to each other, power producing means carried by said frame means, power transmitting means for transmitting power from said producing means to said elements to cause said elements to roll, means for altering the transmission of power to the respective elements to steer the machine, said frame means, by reason of the location of one rolling element rearwardly of another, being entirely dependent upon itself and said rolling elements for support against overturning around the axes of said rolling elements.

26. A self-propelled ground clearing and working machine, comprising a plurality of elongated rolling elements having ground breaking blades on their circumferences, said blades extending substantial distances longitudinally in the general direction of the axes of the respective rolling elements, and being located at angularly spaced positions around the rolling elements, and having their flat faces arranged substantially radially, means connecting said rolling elements to one another and holding them in controlled relationship, with the centers of the rolling elements spaced laterally on opposite sides of the center of the machine, and with one of said rolling elements located rearwardly of another, whereby said connecting means is entirely dependent upon itself and said rolling elements for stability against overturning around the axes of the rolling elements, means for producing power for driving said rolling elements, power transmission means connecting the power means with the respective rolling elements, and means for controlling and altering the power supplied to the respective rolling elements to guide the machine without changing the angle between the axes of the respective rolling elements.

References Cited in the file of this patent

UNITED STATES PATENTS

| Number | Name | Date |
|---|---|---|
| 747,536 | Caton | Dec. 22, 1903 |
| 828,575 | Schilling | Aug. 14, 1906 |
| 914,453 | Pfarrer | Mar. 9, 1909 |
| 975,305 | Wait | Nov. 8, 1910 |
| 1,043,239 | Lee | Nov. 5, 1912 |
| 1,059,498 | Squires | Apr. 22, 1913 |
| 1,158,109 | Cook et al. | Oct. 26, 1915 |
| 1,189,783 | Black | July 4, 1916 |
| 1,231,352 | Hickman | June 26, 1917 |
| 1,276,843 | Wentworth | Aug. 27, 1918 |
| 1,303,149 | August | May 6, 1919 |
| 1,303,150 | August | May 6, 1919 |
| 1,319,936 | Wentworth | Oct. 28, 1919 |
| 1,525,262 | Austin | Feb. 3, 1925 |
| 1,543,515 | Pickard | June 23, 1925 |
| 1,756,495 | Rowley | Apr. 29, 1930 |
| 1,773,253 | Bager et al. | Aug. 19, 1930 |
| 1,807,784 | Geffroy | June 2, 1931 |
| 1,854,052 | McDowall | Apr. 12, 1932 |
| 1,878,442 | Hamshaw | Sept. 20, 1932 |
| 2,063,769 | Suelflow et al. | Dec. 8, 1936 |
| 2,132,107 | Hamm | Oct. 4, 1938 |
| 2,226,182 | Ross | Dec. 24, 1940 |
| 2,260,344 | Shaw | Oct. 28, 1941 |
| 2,510,817 | Greiner et al. | June 6, 1950 |

FOREIGN PATENTS

| Number | Country | Date |
|---|---|---|
| 49,738 | Sweden | July 9, 1918 |
| 116,291 | Great Britain | Dec. 24, 1918 |
| 65,742 | Sweden | June 4, 1926 |
| 650,141 | France | Jan. 4, 1929 |